W. M. BOEHM.
DEVICE FOR EVAPORATING VOLATILE LIQUIDS.
APPLICATION FILED AUG. 7, 1919.

1,358,928.

Patented Nov. 16, 1920.

Inventor
Walter M. Boehm
By
H. A. Gourick
Attorney

UNITED STATES PATENT OFFICE.

WALTER M. BOEHM, OF HIGHLAND PARK, PENNSYLVANIA.

DEVICE FOR EVAPORATING VOLATILE LIQUIDS.

1,358,928.  Specification of Letters Patent.  Patented Nov. 16, 1920.

Application filed August 7, 1919. Serial No. 315,926.

*To all whom it may concern:*

Be it known that I, WALTER M. BOEHM, a citizen of the United States, residing at Highland Park, in the county of Delaware and State of Pennsylvania, have invented certain new and useful Improvements in Devices for Evaporating Volatile Liquids, of which the following is a specification.

This invention relates to disinfecting apparatus and has for its object the provision of a novel device by means of which a liquid such as a disinfectant, deodorant or germicide may be readily evaporated at a desired rate and diffused into the air.

An important object is the provision of a device of this character including a liquid reservoir and a permeable body absorbing liquid from the reservoir and serving as a distributer, the liquid evaporating from the body.

Another object is the provision of a device of this character which will be simple and inexpensive in manufacture, efficient and economical in use, durable in service, and a general improvement in the art.

With the above and other objects and advantages in view, my invention consists in the details of construction to be hereinafter more fully described and claimed, and illustrated in the accompanying drawings, in which—

Figures 1, 2:
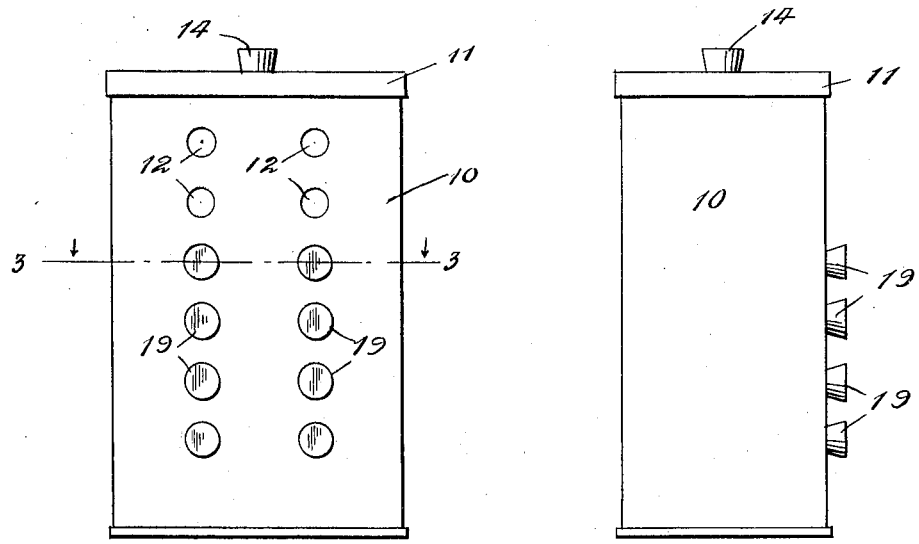
Figure 1 is a front elevation of the device.
Fig. 2 is a side elevation.
Figure 3:
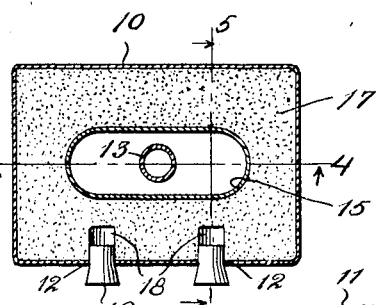
Fig. 3 is a cross section on the line 3—3 of Fig. 1.
Figure 4:
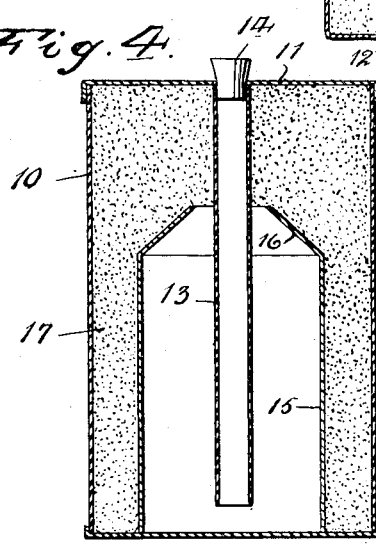
Fig. 4 is a longitudinal section on the line 4—4 of Fig. 3.
Figure 5:
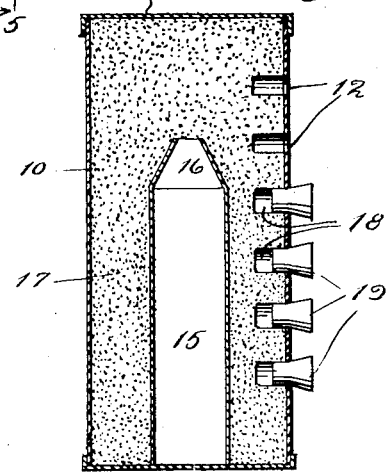
Fig. 5 is a longitudinal section on the line 5—5 of Fig. 3.

Referring more particularly to the drawings, the numeral 10 designates a casing formed preferably of sheet metal and of any desired shape, rectangular as shown being a suitable form. The casing is provided with a cover 11 which may be detachable, or not, as preferred. This casing is provided in one or more sides, only one in the drawing, with one, or more, series of vertically spaced holes 12. Secured upon the underside of the cover 11 is a depending tube 13 which terminates adjacent the bottom of the casing. The cover is provided with a hole communicating with the tube and the hole is normally closed by a stopper 14.

Disposed centrally upon the bottom of the casing is a receptacle 15 having an open top and into which the filler tube 13 extends. The top of this receptacle, which is designed to serve as a reservoir, terminates a considerable distance below the top of the casing. The upper end of this receptacle is preferably provided with a permanent or a detachable cap 16 having a constricted opening.

Disposed within the casing and completely filling the interior thereof unoccupied by the tube 13 and receptacle 15 is a body 17 of inert, permeable, porous material. This body is provided with a series of recesses 18 which register with the holes 12 in the casing, and the holes are provided with suitable stoppers 19 which extend into the recesses 18 for a purpose to be described.

In the use of the device the stopper 14 is removed and the liquid to be evaporated or diffused into the air is poured through the tube 13 into the receptacle 15, after which the stopper 14 is reinserted. After a time the permeable body 17 will become saturated with the liquid. To cause evaporation, the stoppers 19 are removed, the number removed depending upon the rate of evaporation desired, whereupon evaporation will occur through the recesses 18 and holes 12. The liquid evaporating through these recesses and holes is automatically replaced by capillary action by the liquid in the reservoir 15. The process may be continued until all the liquid in the reservoir is exhausted, the evaporation being retarded more and more until the supply within the porous body and in the reservoir is exhausted. The reservoir receptacle may be refilled at any time and the operator is made aware of such necessity by a marked decrease in the rate of evaporation. By inserting all the stoppers 19 evaporation may be discontinued at any time.

From the foregoing description and study of the drawings it will be apparent that I have thus provided an extremely simple device for evaporating liquids, such as disinfectants, deodorants and germicides, in a highly efficient manner, the rate of evaporation being at all times under the control of the operator. It will also be seen that the device will require very little attention as the action is automatic and as there are no moving parts to become disarranged.

While I have shown and described the preferred embodiment of the invention, it will of course be readily understood that I reserve the right to make such changes in the form, construction and arrangement of parts as will not depart from the spirit of the invention or the scope of the subjoined claims.

I claim:

1. A device of the character described comprising a casing having a cover, a receptacle within the lower portion of said casing and spaced from the walls thereof, a filler tube extending from said cover downwardly into said receptacle and terminating short of the bottom thereof, means normally closing the entrance to said filler tube, the top of said receptacle being formed with an opening of greater size than said filler tube, a body of permeable material disposed within said casing and entirely filling the space between the same and said receptacle and said filler tube, one side of the casing being provided with a series of holes, and stoppers engaged within said holes and selectively removable whereby to regulate the passage therethrough of the vapors evaporating from said permeable material.

2. A device of the character described comprising a casing having a cover, a receptacle within the lower portion of said casing and spaced from the walls thereof, a filler tube extending from said cover downwardly into said receptacle and terminating short of the bottom thereof, means normally closing the entrance to said filler tube, the top of said receptacle being formed with an opening of greater size than said filler tube, a body of permeable material disposed within said casing and entirely filling the space between the same and said receptacle and said filler tube, one side of the casing being provided with a series of holes, and stoppers engaged within said holes and selectively removable whereby to regulate the passage therethrough of vapors evaporating from said permeable material, said body of permeable material being provided opposite said holes with recesses receiving said stoppers.

In testimony whereof I hereto affix my signature.

WALTER M. BOEHM.